Oct. 10, 1933.  F. S. BARKS  1,930,222
LUBRICATING APPARATUS
Filed July 30, 1930  5 Sheets-Sheet 1

Frank S. Barks,
Inventor.
Delos G. Haynes,
Attorney.

Oct. 10, 1933.   F. S. BARKS   1,930,222
LUBRICATING APPARATUS
Filed July 30, 1930   5 Sheets-Sheet 2
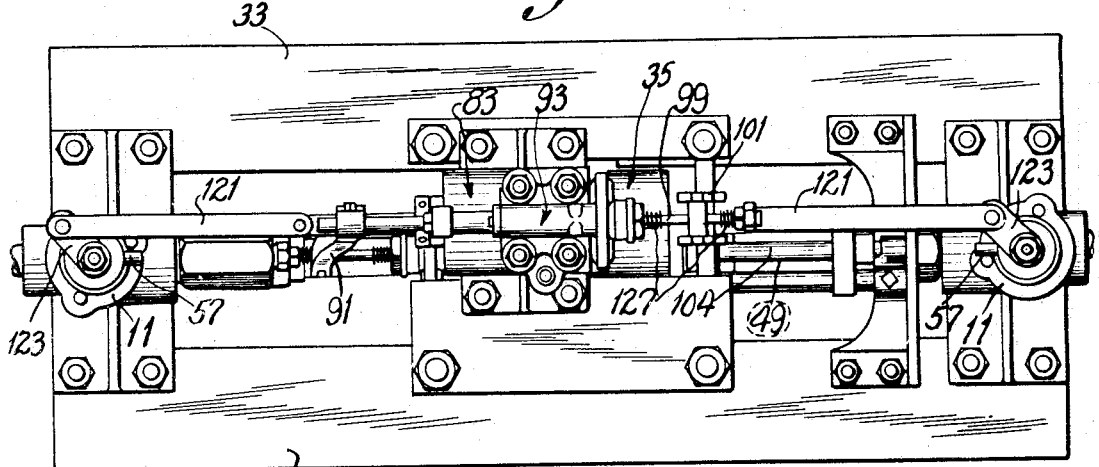
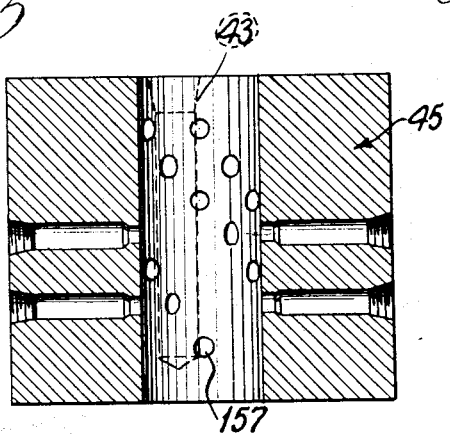
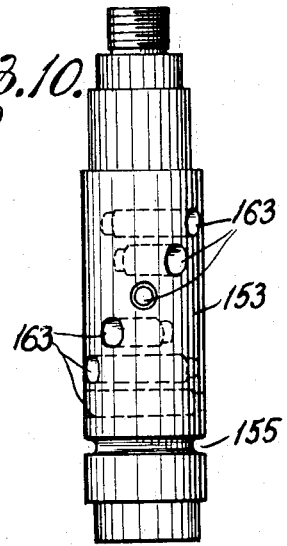
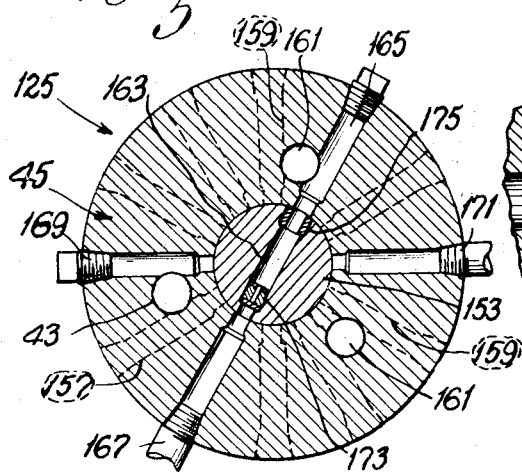
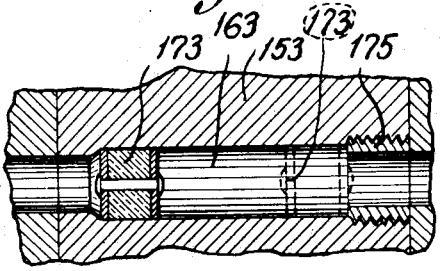

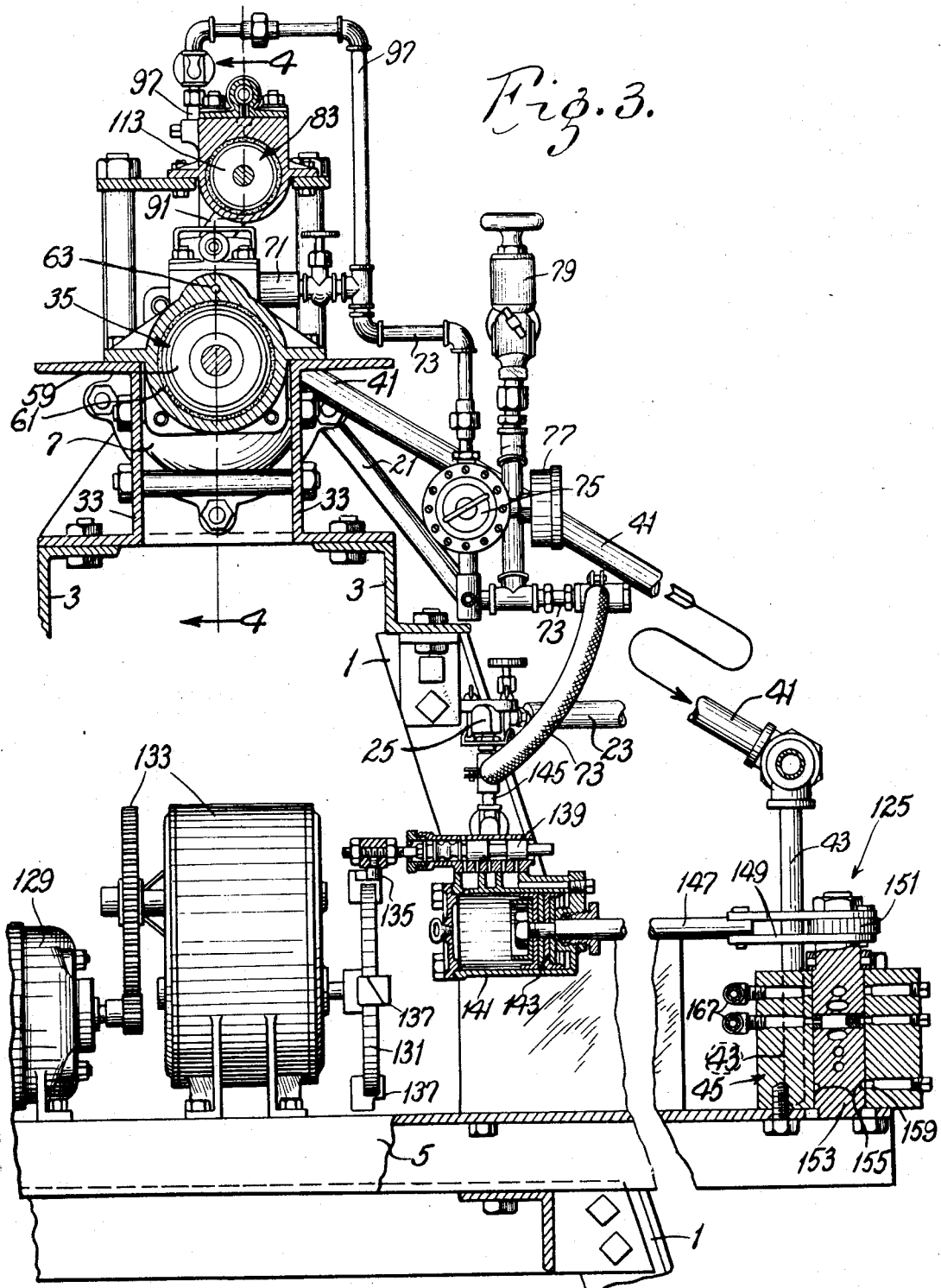

Oct. 10, 1933.   F. S. BARKS   1,930,222
LUBRICATING APPARATUS
Filed July 30, 1930   5 Sheets-Sheet 4
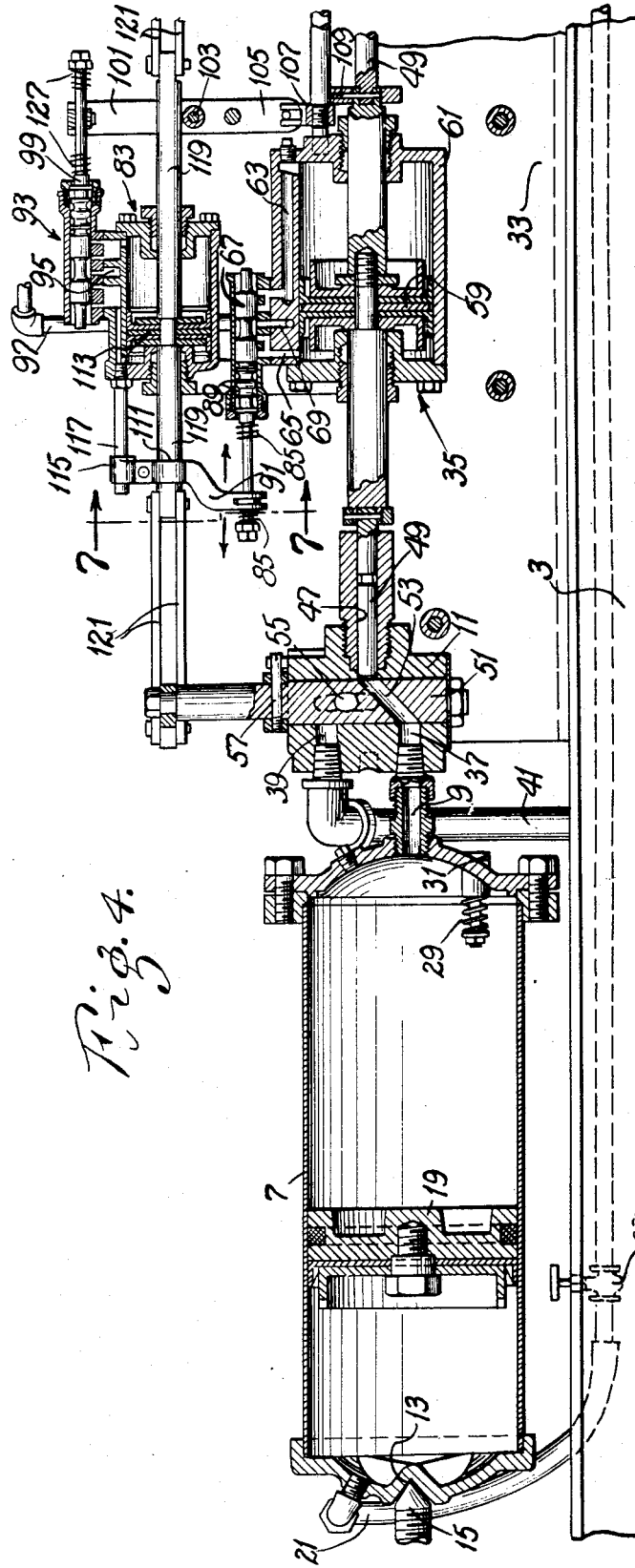
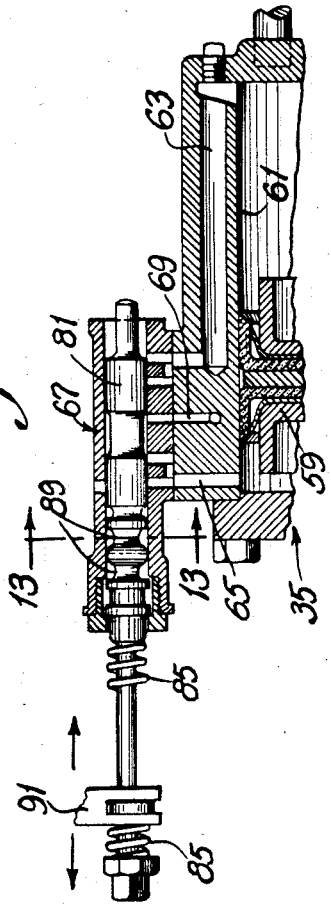
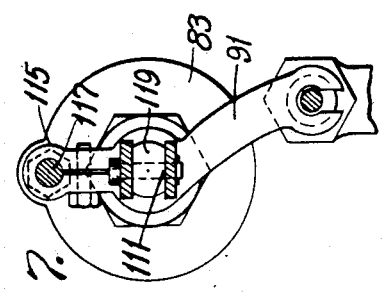

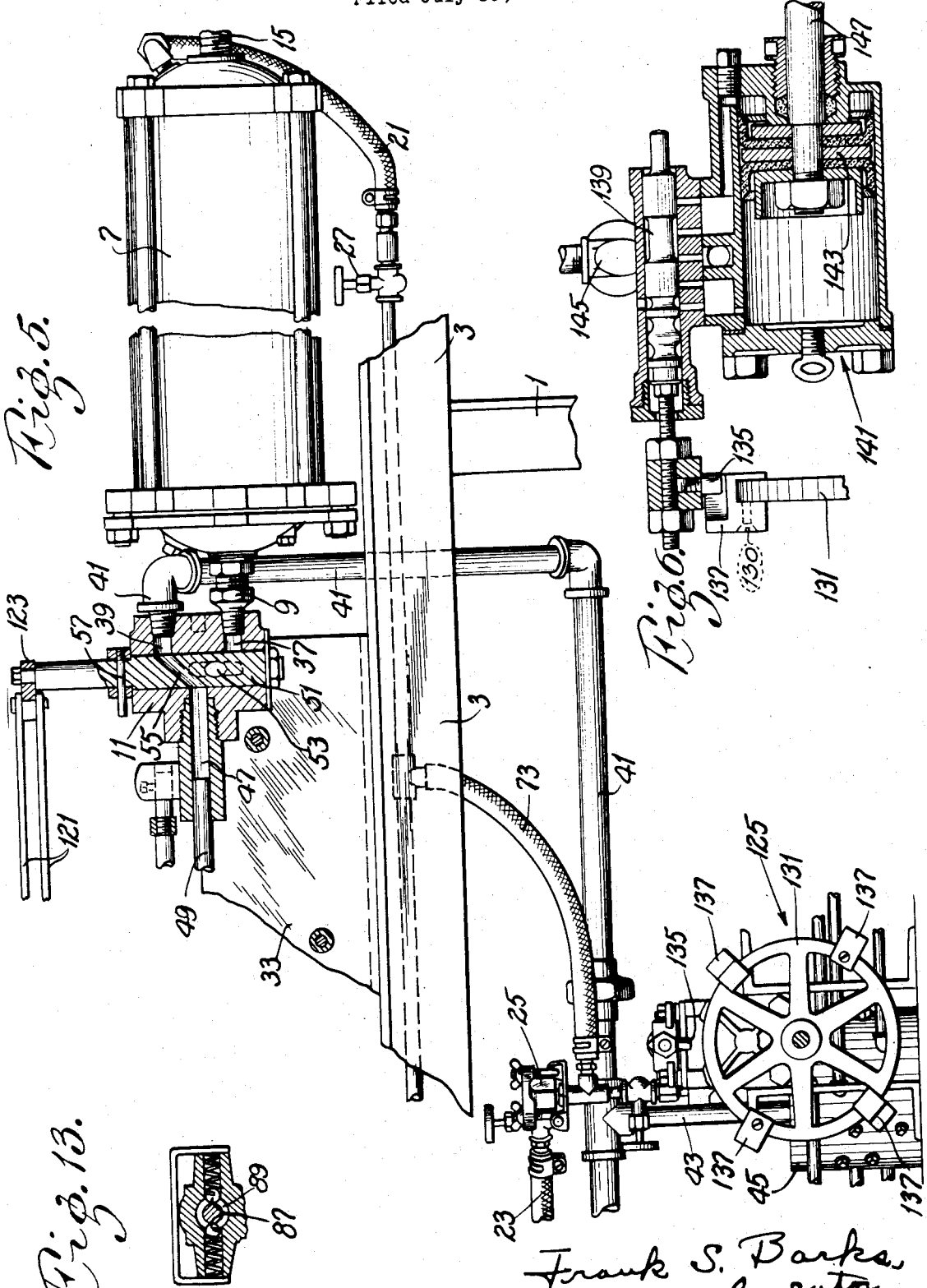

Patented Oct. 10, 1933

1,930,222

UNITED STATES PATENT OFFICE 1,930,222

LUBRICATING APPARATUS

Frank S. Barks, St. Louis, Mo.

Application July 30, 1930. Serial No. 471,635

13 Claims. (Cl. 184—35)

This invention relates to lubricating apparatus, and with regard to certain more specific features, to automatic lubricating apparatus for delivering to bearings or the like measured amounts of heavy or light lubricant at predetermined intervals.

Among the several objects of the invention may be noted the following:

The provision of means for timing the flow of lubricant supplied to a plurality of bearings.

The provision of means for definitely measuring the supply of lubricant supplied to each bearing at predetermined intervals, said definite measure being adapted to be changed from time to time.

The provision of means for readily maintaining a supply of grease for delivery to the machine and for distribution.

The provision of means for effecting a positive cut-off and distribution of the heaviest and most viscous greases and the like, as well as for the lighter types, a valve mechanism being interlocked for a definite and noninterfering sequence of events.

Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a rear elevation, a rearwardly located motor and gear train being broken away for clarity;

Fig. 2 is a partial plan view showing certain pumping elements of the machine;

Fig. 3 is a vertical section taken substantially on line 3—3 of Fig. 1, certain portions being broken away for clarity;

Fig. 4 is a diagrammatic section taken on line 4—4 of Fig. 3;

Fig. 5 is a continuation to the right of the parts shown in Fig. 4 and extended downwardly to include a timing mechanism;

Fig. 6 is an enlarged detail of a pneumatic device for effecting or controlling distribution, the view being an enlargement of that device as shown in Fig. 3;

Fig. 7 is a cross section taken on line 7—7 of Fig. 4;

Fig. 8 is an enlarged view showing certain details of a full stroke valve gear for an air engine, the figure showing an enlargement of that device as shown in Fig. 4;

Fig. 9 is a detailed cross section of a distribution barrel;

Fig. 10 is an enlarged detail of a distribution stem;

Fig. 11 is a representative horizontal section taken through the elements of Figs. 9 and 10 when assembled;

Fig. 12 is an enlarged cross section showing a distribution measuring plunger; and, Fig. 13 is a cross section taken on line 13—13 of Fig. 8.

Similar reference characters indicate corresponding parts throughout the several views of the drawings.

Figure 1:
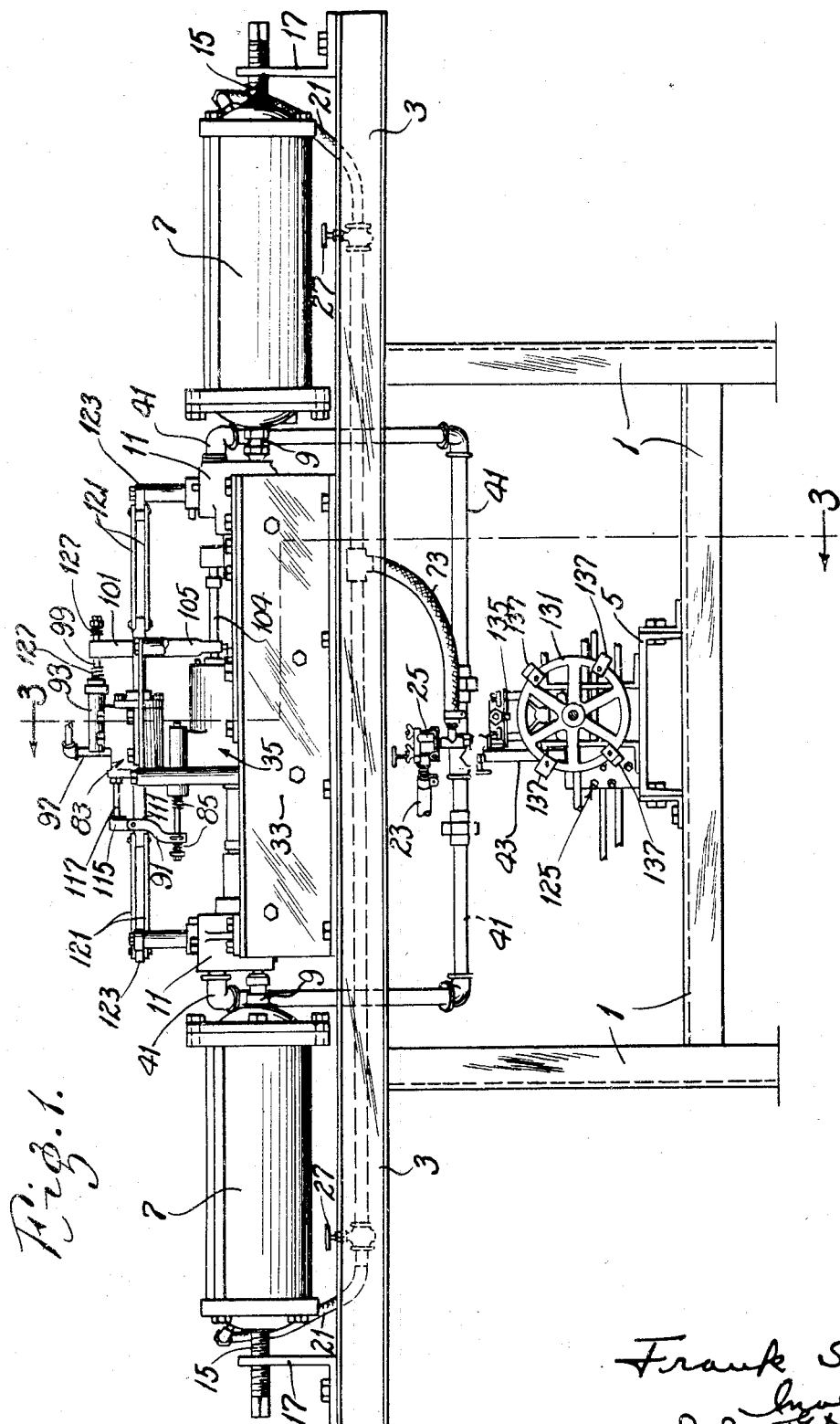

Machinery for steel mills and the like ordinarily requires a heavy grease for lubricating purposes. The ordinary lubricators fail to properly lubricate such machines, first, because they are not automatic in their operation and, second, because their valves or methods of controlling and distributing the grease are not adapted to the viscous material which must be handled. For instance, spring-seating valves are not successful, because a positive cut-off is not provided, nor do they effect a positive timing of events.

Referring now more particularly to Fig. 1, there is illustrated at numeral 1 a framework having an upper channel table 3 and a lower channel table 5. The upper table 3 carries the lubricating supply, pumping and valve arrangements, whereas the lower table 5 carries the timing and distribution arrangements.

At each end of the upper table 3 is supported a cylindrical lubricant supply chamber 7 which, by means of a coupling 9, is removably fastened to the body of a valve 11. Each chamber 7 extends laterally and is provided with a depression 13 with which cooperates a pivot pin 15 threaded through an end bracket 17. Each pivot 15 may be unscrewed from its notch 13 to permit removing of its respective chamber 7. Then by disconnecting the supply lines, each chamber 7, when empty, may be replaced with a loaded substitute.

Each cylinder or chamber 7 is provided with a free follower piston 19 ahead of which grease is packed prior to applying the chamber to the present machine and behind which air is led by a connected air line 21. Each air line 21 communicates with a main supply of compressed air by means of a line 73 leading to an air chuck 25. Suitable valves 27 may be used to shut off the air supply to these cylinders when replacements and/or refillings are made.

Thus it will be seen that means is provided for effecting a supply of grease which is under super-atmospheric pressure. Spring pressed, indicating pins 29 having outside indicating heads 31 are used for indicating when the supply cylinders 7 are empty, contact by the piston 19 with pin 29 effecting the indication by pressing out the head 31.

Mounted centrally on the upper table 3 is a platform 33 for supporting an air engine 35 and associated valve parts. Included in these valve parts are the valves 11, each one of which comprises an inlet port 37 in communication with a cylinder 7 and an outlet port 39. Each outlet port 39 communicates by way of a line 41 with an inlet 43 of a distribution block 45, the function of which will be hereinafter described (see Figs. 3 and 9).

In connection with each valve 11 is also a plunger cylinder 47 having a reciprocating plunger 49 herein operated by said engine 35. Each valve 11 has a valve stem 51 provided with bores 53 and 55, drilled at right angles and provided with such slopes that upon oscillating the valve stem 51 successive connections can be made between the inlet port 37 and the plunger bore 47 (by way of passage 53), and between the outlet port 39 and said bore 47 (by way of bore 55). Thus when the plunger 49 is withdrawn, the valve stem 51 is in the position shown in Fig. 4, whereupon grease will be drawn into and forced (by means of air pressure in the cylinder 7) into the bore 47. Conversely, when the stem 51 is turned 90° from the Fig. 4 position to the Fig. 5 position and the plunger 49 is ready for expelling a charge, the supply chamber is cut off and the line 41 put into connection with said bore 47 by the bore 55 in stem 51. It will be appreciated that the bore stem 51 comprises a definite and positive means for cutting off the flow of heavy or light grease, as distinguished from the spring-pressed type of valve which has been unsuccessful. A limiting stop device 57 is used for insuring a 90° swing.

The air engine 35 which is used for reciprocating the plungers 49 is of the double acting type having a piston 59 which is arranged in tandem with said plungers 49 (see Figs. 4 and 5). The cylinder 61 thereof is ported as indicated at numerals 63 and 65 for admitting and releasing air through a full stroke piston valve 67. The inlet for the piston valve 67 and ports 63 and 65 is shown at numeral 69 and is supplied from a branch pipe 71 which communicates with a line 73 connecting with said chuck 25. A manually adjustable pressure regulator 75 is used in connection with a gauge 77 for adjusting the pressure which passes to the air engine 35 and a valve controlling device to be described. A drip lubricator 79 is used for supplying a liquid lubricant in the air line, whereby the parts in connection therewith are lubricated.

Fig. 8 shows an enlargement of the full stroke valve which functions to admit and release air to and from the opposite sides of the piston 59. The stem 81 of this full stroke valve is operated to reciprocate from a secondary air engine 83, this being done by way of the fork 91 which drives said stem 81 by delayed action through compressing springs 85 in a manner already known in this art. The delay is such that the valve stem 81 is operated its full stroke substantially at the ends of the stroking of the engine 83 and its fork 91. Full details of valves of this type may be found in the Patent 1,667,138, issued to me on April 24, 1928. Fig. 13 shows detent balls 87 cooperating with spaced grooves 89 for resiliently cooperating with the stem 81 to positively place it in its extreme positions as it is reciprocated by the delayed action of fork 91. Inasmuch as this type of valve is now known, further description is unnecessary, except insofar as cooperation with other elements is concerned.

Mounted above the engine 35 is the secondary engine 83 for operating the valve stems 51. This engine 83 is essentially of the same type as 35 and has the same type of full stroke valve gear as shown at numeral 93. This valve gear 93 has an inlet 95 with an air connection 97 leading to said line 73, so that it will be seen that both the primary air engine 35 and the secondary air engine 93 receive their air from the same regulated source 73.

The stem 99 of the valve gear 93 is operated by an oscillating fork 101 which pivots on a bolt 103. This fork 101 has a lower extension 105 with which cooperates a sliding cross head 107 driven by a connection 109 with tandem reciprocating elements 104 of the air engine 35.

The full stroke valve gear of the engine 35 is driven by the fork 91 and thus controlled by reciprocation of the secondary engine 83. The fork 91 is connected as shown at numeral 111 with the piston rod of the piston 113 of said secondary engine 83. The lug 115 comprises a slidable rider on the guide 117.

Thus it will be seen that the reciprocation of the rimary air engine 35 results in operating the valve gear of the secondary engine 83 and, inasmuch as this valve gear is of the delayed, full stroke type, the valve is not thrown to reverse the secondary engine 83 until the primary engine 35 has reached the end of its stroke. Likewise, the valve gear for the primary air engine 35 does not operate to reverse the stroke of said engine until the piston of the secondary engine 83 has reached the end of its stroke. Likewise, the valve gear for the primary air engine 35 does not operate to reverse the stroke of said engine until the piston of the secondary engine 83 has reached the end of its stroke. This is because the valve gear of the primary engine 35 is operated by the secondary engine 83. Thus it will be seen that there is a positive arrangement for insuring that each engine is not reversed until the other has attained the end of its stroke. This interlocking arrangement of two fluid engines and their valve gears is believed to be novel.

Each reciprocating piston rod of the secondary engine 83 is connected at its outer end (see Fig. 2) to a connecting rod 121 and each connecting rod 121 is in turn connected to a crank 123. Each crank 123, as shown in Fig. 4 is fastened to one of the valve stems 51. Inasmuch as the phase relationship between the two valve stems 51 is 90°, as illustrated by Figs. 4 and 5, it is apparent that as the secondary engine 83 reciprocates the opposite tanks 7 are alternately put into communication with the cylinders 47 as the plungers 49 recede in said cylinders 47. At the same time alternate pumping strokes are exerted by the plungers 49 to deliver charges into the lines 41. Inasmuch as the lines 41 pass to the common supply line 43 for the distribution device 125, it will be seen that there is practically effected a continuous flow in said supply line 43. The operation is entirely successful, because (referring to Fig. 4), as the primary air engine 35 draws in a charge from the cylinder 7, it makes a stroke in a predetermined direction (to the right in Fig. 4). The piston of the secondary air engine 83 remains at the left (as shown in Fig. 4), because its valve gear 93 does not operate until a full stroke is effected by the piston 59. This is true because the spring 127 on the valve stem 99, taken in connection with the detention means therefor (see Fig. 13, for example) delays the action of the full stroke valve 93 until the end of the stroke of piston 59 has been reached. Then the valve 93 moves its full stroke to a position such as to admit air to the left of piston 113. At the same time a full charge has been drawn into the cylinder 47 of Fig. 4. Then as the piston 113 moves to the right the communication with cylinder 7 is positively cut off and a communication between cylinders 47 and the outlet 39 is effected.

The valve gear for the primary engine 35 is in turn not operated until a full stroke of the piston 113 has been effected so that the operation of the valve stem 51 is assuredly delayed until the piston 59 has again come completely to the left hand end of its stroke. After this has occurred, valve 93 resets so as to force the piston 113 back to its left hand setting. Hence the primary air engine 35 pumps only during periods that the valve stems 51 are at rest. The above elements, combined as they are, effect a positive cut-off in a mass of grease that is not moving.

As above stated, the mechanism described supplies a continuous pressure of grease to the line 43. If an obstruction is put into said line 43 the pressure will build up until it counter-balances the effect of the air pressure on the area of piston 59. Thus grease is pumped and supplied to the line 43 only as long as said line requires it, that is, as long as the distributor 125 permits a flow from the line 43 so as to lower the line pressure.

A distributor is mounted on said lower table 5, and comprises a motor 129 driving a cam 131 through a reduction gear and box 133 (Fig. 3). The cam 131 is of the adjustable barrel type which functions to reciprocate a follower 135 a number of times per revolution of the cam 131. The number of reciprocations is and depends upon the number of faces 137 on the cam 131 but in the present embodiment comprises two reciprocations per revolution of the cam, that is, the follower is given two outward strokes and two with-drawing strokes per cam revolution by four camming faces 137.

The follower 135 is fastened to a valve stem 139 of a full stroke valve associated with a third air engine 141. The engine 141 has all of the characteristics of the engines above described, including the application of the full stroke valve gear thereto, except that the valve gear is caused to move by the cam 131, instead of by another engine. It has double action so that for each resetting of the valve stem 139 there is an admission of air which effects a reversing stroke of the piston 143 of said engine 141. Air is supplied to this engine by line 145 which is in communication with said chuck 25. Thus through controlling the valve stem 139 of the engine 141 (see cam 131), the strokes of said engine are controlled and are predeterminately timed.

The piston rod 147 of the engine 141 is linked with a connecting rod 149 which in turn is connected with a crank 151. The crank 151 is fastened to the upper end of a valve stem 153 which rotatably fits within the central bore of the distributor body 45. The stroking of the engine 141 oscillates the valve stem 153 through 60°.

At the bottom the valve stem 153 is provided with a peripheral recess 155 which registers with a series of three openings 157 at the bottom of the distributor body 45, one of said openings 157 being in communication with the inlet 43 and the other two (numbered 159) being in communication with vertical openings 161. The purpose of the inlet 43 and vertical openings 161, with their communicating recess 155 is to provide a distribution of grease to a series of inlet and outlet ports which are adapted to be put into and out of communication by a series of connecting passages 163 in the valve stem 155. A typical plane is illustrated in Fig. 11 in which numeral 165 indicates an inlet and numeral 167 an outlet. Numeral 169 represents an inlet and numeral 171 an outlet. The outlets 167 and 171 are typical of outlets which are used to communicate with various bearings on the machine to be lubricated. The two numbered 167 and 171 in Fig. 11 are typical of similar outlets in six other planes in the distributor arranged with respect to their inlets in a similar manner to that shown in said Fig. 11. The construction in each plane is however, turned through 60° from that shown in Fig. 11 (see also Fig. 10) in order to better space the openings and plugs used in connection therewith, so that they may be more easily manufactured and/or reached for repairs.

Each set of inlets and outlets has its connecting passage 163 as shown in Fig. 10. In each connecting passage 163 is a free piston 173. It will be seen from Fig. 11 that grease under pressure entering the inlet 165 forces the free plug or piston 163 as shown and thereby fills up the hole 163 behind the plug 173. Then when the valve stem 153 moves through 60° clockwise, the pressure from the inlet 169 forces the plug to the right and the charge of grease which was held in the opening 163 is forced out of the outlet 171. Thus a measured charge of grease is forced into each bearing line. Also, as the pressure is applied behind the plug 173, a new charge of grease is inserted therebehind for delivery from the outlet 167 by pressure at inlet 165 upon the next oscillation. If at any time it is desirable that a greater or lesser charge of grease be delivered, the size of the plug 173 may be changed. This can be done by reason of the use of a screwed bushing 175 (see Fig. 12).

It is pointed out that Fig. 11 shows the operation in one plane and that the number of planes for distribution may be multiplied indefinitely, six being shown in the present embodiment. Each plane of distribution effects a distributor to two outlets.

The operation of the device is as follows: The cylinders 7 are loaded, preferably in a clean place at a distance away from the machine. They are then brought to the machine (Fig. 1) and the coupling 9 is made, after which the pivot pins 15 are screwed up and the air connections 21 made. Suitable connections are made between the outlets (exemplified at numerals 167 and 171) and the bearings to be lubricated. The air chuck 25 which is connected to an air supply line 23 is then made fast. Thus air is supplied to the engine 141 by way of line 145. At the same time line 73 carries air to the lines 21 behind the floating pistons of cylinder 7. Air also passes through the regulator 75 and through the primary engine 35 and secondary air engine 83 respectively.

By opening the proper valves the engines 35 and 83 will be caused to start. Engine 35 reciprocates, as does also engine 83. Their reciprocation is interlocked in the manner above described, because of the mechanical interlocking arrangement between their valve gears. Hence the engine 35 pumps as the engine 83 controls the operation of valves 11. By this means grease is withdrawn from the chamber 7 and forced into the lines 41. The two flows of grease are made at the line 43 from whence all of the grease is delivered to the distributor 125. If the distributor is not operating, pressure will soon build up in the grease lines and block the action of the engines 35 and 83. The machine will then stand idle but under pressure, ready for use, until the distributing mechanism is turned on.

The distribution mechanism is put into operation by energizing the motor 129 which, through the reduction train 133, causes the cam 131 to turn and throw the valve of motor 141 back and forth to cause reciprocation of said motor 141, according to periods determined by the placement on said cam 131 of the cam face blocks 137. The face blocks 137, as shown in Fig. 1, are frictionally held to the periphery of the cam 130 by suitable screws. Thus they are rendered adjustable so that the timing of the distribution may be adjusted. The valve stem 153 of the distributor 125 is caused to oscillate and distribute measured quantities of grease in the manner set out. Release of grease from the line 43 lowers the pressure therein so that the air pressure in the engines 35 and 38 overbalances the resistance and starts these engines.

The measured quantity of grease may be changed at any time by substituting different lengths of plugs 173 which causes displacement of more or less volume and thus changes the amount if grease delivered.

One of the advantages of this invention is that each separate line to each separate bearing is put into communication with the pressure system and positively receives grease. It is not like a system wherein different bearings are attached to branch grease lines and a pressure maintained on a trunk line, for in such a system the bearing with the least resistance gets the most lubricant, and the bearing with the most resistance is the one that ordinarily requires the most lubricant. With the present invention each separate bearing line has the same pressure built up in it.

Another advantage is that all grease, in the mill, for example, can be distributed from a central point. A number of the cylinders can be maintained in a loaded condition at some point and brought to the lubricating machines herein described as said machines give indications at the indicators 31 that they are empty.

A further advantage is that by varying the sizes of the plugs 173, various sizes of charges may be distributed to various lines.

It will be understood that the motor 129 will be varied in speed according to the usual methods and thus provide another means of regulating the timing.

It will also be understood that the use of this machine is not limited to heavy greases but that it is practicable for lighter greases and other similar materials both heavy and light.

An advantageous construction herein comprises the valve in connection with the pump cylinder 47. Its construction permits not only a positive cut-off but it will be seen that the valve ports 53 and 55 are loaded with grease when out of communication with the inlet and outlet ports. Thus the clearance volume of the reciprocating pump is reduced.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, a material supply chamber having an outlet, a positive cutoff valve at the outlet, a reciprocating plunger for receiving material from the outlet and ejecting said material, an engine for operating said plunger, a secondary engine for positively operating the valve at the outlet, valve gears for said engines, the stroke of each engine controlling the valve gear of the other to cause said other engine to function only at the end of a full stroke.

2. In apparatus of the class described, a timed distribution means, a material supply chamber having an outlet, a positive cutoff valve at the outlet, a reciprocating plunger for receiving material from the outlet and delivering it to said distribution means, an engine for operating said plunger, a secondary engine for positively operating the valve at the outlet, valve gears for said engines, the stroke of each engine controlling the valve gear of the other to cause said other engine to function only at the end of a full stroke.

3. In apparatus of the class described, a pumping means comprising a reciprocating primary engine, a reciprocating secondary engine, valve gears for said engines, the reciprocating elements of each engine operating the valve gear of the other, and means associated with the valve gears adapted to effect delayed action and subsequent instantaneous resetting of said valve gears, said instantaneous resetting occurring only after full strokes of the operating engine are accomplished.

4. In apparatus of the class described, a pumping means comprising a reciprocating primary engine, a reciprocating secondary engine, valve gears for said engines, the reciprocating elements of each engine operating the valve gear of the other, means associated with the valve gears providing resetting of said valve gears only after full strokes of the operating engines are accomplished, a material supply chamber from which said pumping means is adapted to pump, a valve controlling the pumping action, said valve being positively controlled in its operation by one of said engines.

5. In apparatus of the class described, means for maintaining material under pressure in a supply line, a distributor in said supply line, said distributor comprising an oscillable charge receiving element, a plug displaced by the charge delivered to said element, the pressure used in charging the elements functioning also to force material therefrom, an engine for oscillating said element, a valve gear therefor and timing means for controlling said valve gear to cause the engine to operate to oscillate said element.

6. In apparatus of the class described, oppositely disposed material supply chambers, outlets therefor, valve means at said outlets, a primary reciprocating engine between said chambers, reciprocating means in said engine, plungers in tandem with said reciprocating means adapted to alternately withdraw material through said outlets and deliver material therefrom, secondary reciprocating engine associated with the first-named reciprocating engine, valve gears for said reciprocating engines, each engine controlling by its reciprocation the valve gear of the other.

7. In apparatus of the class described, oppositely disposed material supply chambers, outlets therefor, valve means at said outlets, a primary reciprocating engine between said chambers, reciprocating means in said engine, plungers in tandem with said reciprocating means adapted to alternately withdraw material through said outlets and deliver material therefrom, a secondary engine associated with the first-named reciprocating engine, valve gears for the said engines, said secondary engine positively controlling said valves and interlocking means between the valve gears of said engines causing each engine to function only after the other has made a complete stroke.

8. In apparatus of the class described, oppositely disposed material supply chambers, outlets therefor, valve means at said outlets, a primary reciprocating engine between said chambers reciprocating means in said engine, plungers in tandem with said reciprocating means adapted to alternately withdraw material through said outlets and deliver material therefrom, a secondary engine associated with the first-named engine, valve gears for said engines, said secondary reciprocating engine positively controlling said valves and interlocking means between the valve gears of said engines causing each to function only after the other engine has made a complete stroke, means connecting the outlets of said supply chambers, whereby a substantially continuous, built-up pressure is maintained and distributing means communicating with said connecting outlets.

9. In apparatus of the class described, material supply chambers, outlets therefor, valve means at said outlets, a primary reciprocating engine between said chambers, reciprocating means in said engine, plungers for said reciprocating means adapted to alternately withdraw material through said outlets and deliver material therefrom, a secondary engine associated with the first-named engine, valve gears for said engines, said secondary reciprocating engine positively controlling said valves and interlocking means between the valve gears causing each to function only after the other has made a complete stroke, a predeterminately timed distributing means communicating with said connecting outlets, said distributing means including an engine having timed valve gears.

10. In apparatus of the class described, material supply chambers, outlets therefor, valve means at said outlets, a primary reciprocating engine, plungers adapted to alternately withdraw material through said outlets and deliver material therefrom, a secondary engine associated with the first-named reciprocating engine, valve gears for said engines, said secondary reciprocating engine controlling said valves and interlocking means between the valve gears of said engines causing each to function only after the other has made a complete stroke, a predeterminately timed distributing means communicating with said connecting outlets, said distributing means including an engine having timed valve gears, said three engines being air operated from a common source.

11. In apparatus of the class described, oppositely disposed material supply chambers, outlets therefor, valve means at said outlets, a primary reciprocating engine between said chambers, reciprocating means in said engine, plungers in tandem with said reciprocating means adapted to alternately withdraw material through said outlets and deliver material therefrom, a secondary engine associated with the first-named reciprocating engine, valve gears for said engines, said secondary reciprocating engine positively controlling said valves and interlocking means between the valve gears and said engines causing each to function only after the other has made a complete stroke, a predeterminately timed distributing means communicating with said connecting outlets, said distributing means including an engine having timed valve gears, said three engines being air operated and valve gears of the full-stroke type for all of said engines.

12. In lubricating apparatus, a valve comprising a body having a passage therein, an inlet and an outlet juxtaposed thereto, a pump cylinder, a reciprocating plunger in the pump cylinder, a valve stem interposed between the inlet, outlet and pump cylinder, said valve stem being in said passage and ports through said valve stem adapted to alternately join the inlet and outlet passages with the pump cylinder, said ports being adapted to maintain a charge when disconnected, whereby the clearance volume of the pump cylinder is reduced and means for positively turning the valve stem coordinated with the reciprocated plunger so that the stem moves during the period of rest of said plunger and the plunger moves during the period of rest of the valve stem.

13. In apparatus of the class described, a timed distributing means, a material supply chamber having an outlet, a positive cutoff valve at the outlet, a reciprocating plunger for drawing material from the outlet and supplying it to said distribution means, an engine for operating said plunger, a secondary engine for positively operating the valve at the outlet, valve gears for said engines, the stroke of each engine controlling the valve gear of the other to cause said other engine to function and means for operating said distribution means according to a timed sequence.

FRANK S. BARKS.